United States Patent
Furihata et al.

(10) Patent No.: US 9,621,793 B2
(45) Date of Patent: Apr. 11, 2017

(54) INFORMATION PROCESSING APPARATUS, METHOD THEREFOR, AND MEASUREMENT APPARATUS

(71) Applicant: CANON KABUSHIKI KAISHA, Tokyo (JP)

(72) Inventors: Hisayoshi Furihata, Tokyo (JP); Masakazu Fujiki, Kawasaki (JP); Kazuhiko Kobayashi, Yokohama (JP); Masahiro Suzuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 225 days.

(21) Appl. No.: 14/682,143

(22) Filed: Apr. 9, 2015

(65) Prior Publication Data
US 2015/0292863 A1     Oct. 15, 2015

(30) Foreign Application Priority Data

Apr. 15, 2014 (JP) ................................. 2014-083994

(51) Int. Cl.
    *H04N 7/18*        (2006.01)
    *H04N 5/232*     (2006.01)
    (Continued)

(52) U.S. Cl.
    CPC ..... *H04N 5/23216* (2013.01); *G01B 11/2522* (2013.01); *G01J 9/00* (2013.01);
    (Continued)

(58) Field of Classification Search
CPC ............................ G01B 11/022; G01B 11/024
See application file for complete search history.

(56) References Cited

U.S. PATENT DOCUMENTS 4,965,442 A * 10/1990 Girod ....................... G02B 7/36
                                                           250/201.7
8,686,943 B1 * 4/2014 Rafii ...................... G06F 3/017
                                                           345/158
(Continued)

FOREIGN PATENT DOCUMENTS

DE    102013205762 A1    10/2013
JP         01-274007 A     11/1989
(Continued)

OTHER PUBLICATIONS

Kawasaki, Hiroshi, et al. "Structured light with coded aperture for wide range 3D measurement." Image Processing (ICIP), 2012 19th IEEE International Conference. IEEE, 2012.
(Continued)

*Primary Examiner* — Chikaodili E Anyikire
(74) *Attorney, Agent, or Firm* — Carter, DeLuca, Farrell & Schmidt, LLP

(57) ABSTRACT

A spread degree of a geometric feature in a surface of an object to be measured is estimated. The geometric feature is included in a geometric pattern, and will be observed in an image obtained by capturing the object on which the geometric pattern is projected. A parameter is set based on the estimated spread degree. Based on the parameter, a point on the geometric pattern is set in a captured image obtained by capturing the object to be measured on which the geometric pattern is projected. A three-dimensional position on the surface of the object corresponding to the set point is calculated.

18 Claims, 5 Drawing Sheets

(51) Int. Cl.
*G01J 9/00* (2006.01)
*G01B 11/25* (2006.01)
*G06T 7/521* (2017.01)
*G06T 7/593* (2017.01)
*G06T 7/62* (2017.01)

(52) U.S. Cl.
CPC ............. *G06T 7/521* (2017.01); *G06T 7/593* (2017.01); *G06T 7/62* (2017.01); *G06T 2207/20076* (2013.01)

(56) References Cited

U.S. PATENT DOCUMENTS

| | | | | |
|---|---|---|---|---|
| 2011/0164114 | A1* | 7/2011 | Kobayashi | H04N 13/0253 348/46 |
| 2012/0307075 | A1* | 12/2012 | Margalit | G06T 1/0007 348/180 |
| 2013/0010070 | A1* | 1/2013 | Tateno | G01B 11/002 348/46 |
| 2013/0238125 | A1* | 9/2013 | Suzuki | B25J 9/1612 700/253 |
| 2013/0258060 | A1* | 10/2013 | Kotake | G01B 11/25 348/46 |
| 2014/0240492 | A1* | 8/2014 | Lee | H04N 5/2256 348/136 |

FOREIGN PATENT DOCUMENTS

| | | |
|---|---|---|
| JP | 2011-204280 A | 10/2011 |
| WO | 96/41304 A1 | 12/1996 |

OTHER PUBLICATIONS

Great Britain Search Report issued in corresponding application No. GB1505197.2 on Sep. 14, 2015.
German Office Action issued in corresponding application No. 102015005267.5 on Aug. 9, 2016.
German office action issued in corresponding application No. 102015005267.5 on Jan. 29, 2016.
Kimura, et al. "Projector Calibration using Arbitrary Planes and Calibrated Camera", IEEE Computer Vision and Pattern Recognition, CVPR, 2007, pp. 1-2.
R.Y. Tsai, "A versatile camera calibration technique for high-accuracy 3D machine vision metrology using off-the-shelf TV cameras and lenses", IEEE Journal of Robotics and Automation, vol. RA-3, No. 4, 1987, pp. 323-344.

* cited by examiner

INFORMATION PROCESSING APPARATUS, METHOD THEREFOR, AND MEASUREMENT APPARATUS

BACKGROUND OF THE INVENTION

Field of the Invention

The present invention relates to information processing of measuring three-dimensional positions on the surface of an object from an image obtained by capturing the object on which a geometric pattern has been projected, and a measurement apparatus.

Description of the Related Art

As one of three-dimensional position measurement methods, there is known a method called an "active stereo method" of projecting a geometric pattern on an object to be measured, and measuring three-dimensional positions on the surface of the object based on information of an image obtained by capturing the object. At the time of measurement by the active stereo method, the size and shape of a projection image on the image vary due to the influence of a blur and motion blur or the influence of the position and angle of the object surface. Therefore, it becomes difficult to decide the position of the projection image on the image at high accuracy.

To cope with this problem, according to Japanese Patent Laid-Open No. 2011-204280 (literature 1), it is possible to decide the position of a projection image according to a variation of the size of the projection image on an image by preparing images of a plurality of resolutions and checking a filter response to the image of each resolution.

However, the method described in literature 1 decides the position of the projection image based on the images of the plurality of resolutions but does not set an image resolution according to the size of the projection image observed on the image. Thus, the position decision accuracy is low. Consequently, even if the method described in literature 1 is applied to three-dimensional position measurement, the position measurement accuracy is insufficient.

SUMMARY OF THE INVENTION

In one aspect, an information processing apparatus comprising: an estimation unit configured to estimate a spread degree of a geometric feature projected onto a surface of an object to be measured, wherein the geometric feature is included in a geometric pattern projected onto the surface of the object to be measured, and is observed in an image obtained by an image capture unit that captures an image of the object on which the geometric pattern is projected; a parameter setting unit configured to set a parameter based on the estimated spread degree; a point setting unit configured to determine, based on the parameter, a point location of the geometric pattern in a captured image obtained by capturing the image of the object to be measured on which the geometric pattern is projected; and a calculation unit configured to calculate a three-dimensional position on the surface of the object corresponding to the determined point.

According to the aspect, it is possible to measure three-dimensional positions on the surface of an object at high accuracy using an image obtained by capturing the object on which a geometric pattern has been projected.

Further features of the present invention will become apparent from the following description of exemplary embodiments with reference to the attached drawings.

DESCRIPTION OF THE EMBODIMENTS

Preferred embodiments of the present invention will be described in detail below with reference to the accompanying drawings. Note that arrangements to be described in the following embodiments are merely examples, and the present invention is not limited to the illustrated arrangements.

First Embodiment

In this embodiment, a method of measuring, at high accuracy, three-dimensional positions on the surface of an object to be measured (to be referred to as a "target object" hereinafter), from an image obtained by projecting slit light (to be referred to as a "measurement line" hereinafter) on the target object under the conditions that a blur and motion blur occur will be described.

In this embodiment, points on a measurement line are set by checking a local maximum (or local minimum) of an area having a hill-shaped (or valley-shaped) luminance distribution on an image. The local maximum is detected by performing the convolution calculation of luminance values in a direction crossing the measurement line on the image using a differentiation filter such as a Sobel filter, and then checking the zero-crossing point of the calculation result. To correctly detect a zero-crossing point, it is necessary to set a detection filter according to the width of the measurement line observed on the image. It is possible to improve the position accuracy of points set on the measurement line by adapting a filter having a large size to the measurement line with a large width observed, and adapting a filter having a small size to the measurement line with a small width. Note that the width of the measurement line indicates the spread degree of the measurement line. The spread degree is an index indicating the spread of the distribution of luminance values when viewing the luminance values in the direction crossing the measurement line.

In this embodiment, by estimating the spread degree of a measurement line caused by a blur, a motion blur, and the position and angle of the target object, and then setting the shape (response characteristic) of a detection filter based on the estimated value, the measurement line is detected at high accuracy, and points on the measurement line are set at high accuracy. This makes it possible to improve the accuracy of three-dimensional positions calculated with respect to the set points.

[Apparatus Arrangement]

Figure 1:
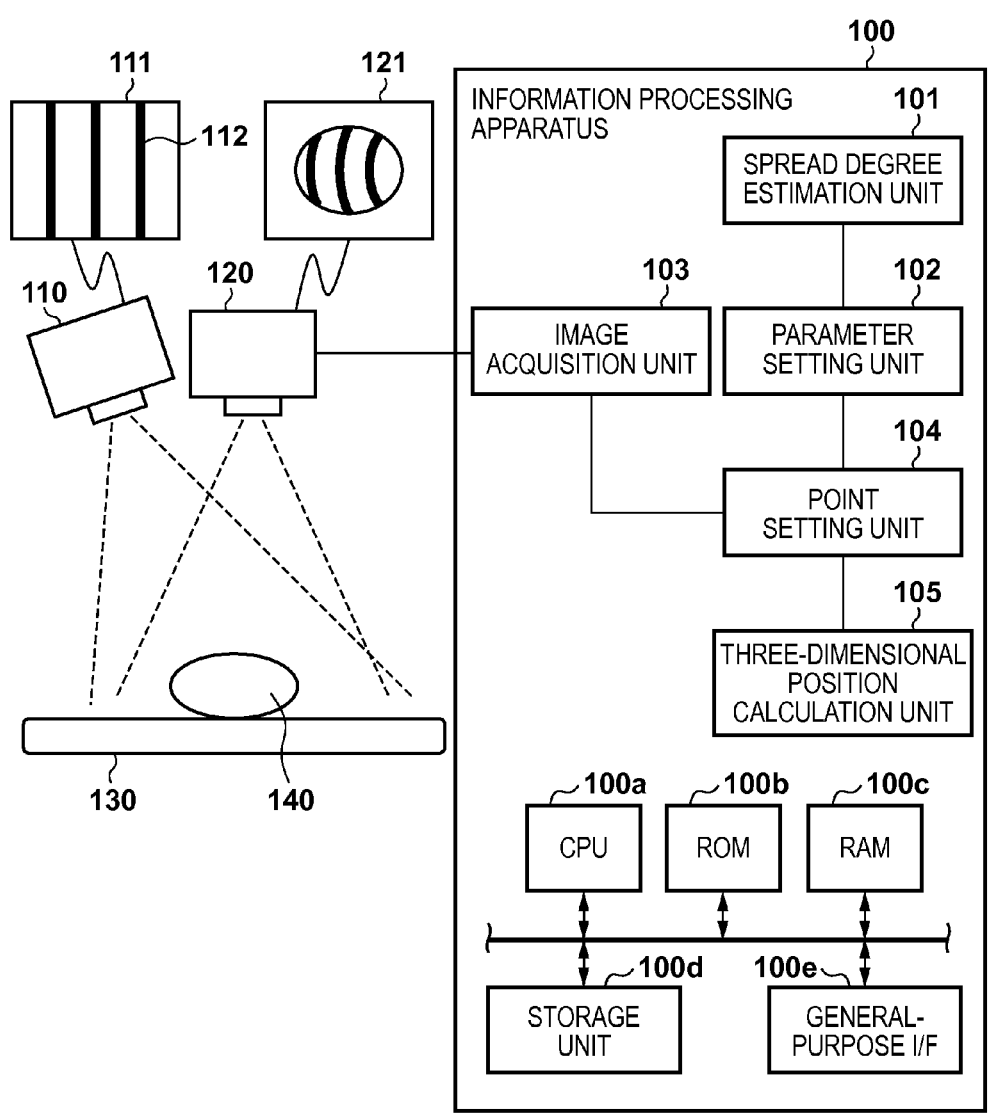
FIG. 1 is a view showing the arrangement of a three-dimensional position measurement apparatus according to an embodiment.

FIG. 1 shows the arrangement of a three-dimensional position measurement apparatus according to this embodiment. The three-dimensional position measurement apparatus according to this embodiment includes an information processing apparatus 100, a projection apparatus 110, a capturing apparatus 120, and a moving apparatus 130.

The projection apparatus 110 projects a geometric pattern 111 on a target object 140 as an object to be measured. The capturing apparatus 120 outputs an image 121 obtained by capturing the target object 140. The geometric pattern 111 includes a plurality of measurement lines 112. Note that the measurement lines 112 are expressed by black bands in FIG. 1. However, the following description assumes that the measurement lines 112 are projected as high-luminance bands to perform a capturing operation. Low-luminance bands may be used as measurement lines by setting a state in which high-luminance light is projected on the entire capturing range, as a matter of course.

The target object 140 is placed on the moving apparatus 130. The moving apparatus 130 is, for example, a conveyor which moves the target object 140 by a predetermined motion vector V. Note that V represents a motion vector of three-dimensional coordinates with respect to the capturing apparatus 120.

The projection apparatus 110 is a projector which projects an image (the geometric pattern 111) indicating a geometric pattern by the density. Intrinsic parameter information such as the focal length, principal point, and lens distortion parameter of the projection apparatus 110, and information indicating the relative position and orientation of the projection apparatus 110 with respect to the capturing apparatus 120 are calibrated in advance. Note that a method described in literature 2 below is used as a calibration method.

Literature 2: M. Kimura, "Projector Calibration using Arbitrary Planes and Calibrated Camera", Computer Vision and Pattern Recognition, CVPR, 2007.

The capturing apparatus 120 is a camera which captures an image. Intrinsic parameter information such as the focal length, principal point, and lens distortion parameter of the capturing apparatus 120 is calibrated in advance. Note that a method described in literature 3 is used as a calibration method.

Literature 3: R. Y. Tsai, "A versatile camera calibration technique for high-accuracy 3D machine vision metrology using off-the-shelf TV cameras and lenses", IEEE Journal of Robotics and Automation, Vol. RA-3, No. 4, 1987.

In this embodiment, the projection apparatus 110 and capturing apparatus 120 are arranged so that their epipolar lines are parallel to the horizontal direction of an image plane. In the following description, when representing a three-dimensional position and direction, values obtained by setting the coordinate system of the capturing apparatus 120 as a world coordinate system are used.

In the information processing apparatus 100, a spread degree estimation unit 101 estimates the spread degree of a geometric feature in the geometric pattern 111, which is observed on an image to be captured by the capturing apparatus 120. In this embodiment, the geometric feature indicates a line, and the spread degree estimation unit 101 estimates the spread degree of the measurement line in the epipolar line direction (the horizontal direction of the image in this embodiment) on the image.

Based on the spread degree of the geometric feature estimated by the spread degree estimation unit 101, a parameter setting unit 102 sets a parameter to be used to set points on the geometric feature. In this embodiment, as the parameter, the shape of a detection filter for detecting the local maximum of the luminance distribution on the image is set.

An image acquisition unit 103 acquires the image 121 obtained by capturing, by the capturing apparatus 120, the geometric pattern 111 projected from the projection apparatus 110 toward the target object 140.

A point setting unit 104 sets points on the geometric feature on the image acquired by the image acquisition unit 103 based on the parameter set by the parameter setting unit 102. In this embodiment, a point at which a local maximum of the luminance distribution is detected on the image is set as a point on the geometric feature, which will be described in detail later. Therefore, the point set by the point setting unit 104 will also be referred to as a "detected point" hereinafter.

A three-dimensional position calculation unit 105 calculates a three-dimensional position on the surface of the target object 140, which corresponds to the detected point set by the point setting unit 104.

A microprocessor 100a of the information processing apparatus 100 executes a three-dimensional position measurement processing program stored in a read only memory (ROM) 100b or a storage unit 100d using a random access memory (RAM) 100c as a work memory, thereby implementing the spread degree estimation unit 101, parameter setting unit 102, point setting unit 104, and three-dimensional position calculation unit 105. Furthermore, the image acquisition unit 103 is implemented when the CPU 100a controls the projection apparatus 110 and capturing apparatus 120 through a general-purpose interface (I/F) 100e such as a USB (Universal Serial Bus) according to the three-dimensional position measurement processing program. Note that the storage unit 100d is a storage device such as a hard disk drive (HDD) or solid-state drive (SSD).

[Three-Dimensional Position Measurement Processing]

The measurement processing executed by the three-dimensional position measurement apparatus according to this embodiment will be described with reference to a flowchart shown in FIG. 2.

Estimation of Spread Degree (S201)

The spread degree estimation unit 101 estimates the spread degree of a geometric feature observed on an image to be captured by the capturing apparatus 120 (S201). The spread degree of the geometric feature is that of a measurement line on the image observed when scanning pixels in the epipolar line direction (in this embodiment, the horizontal direction of the image). In this embodiment, when the luminance distribution (to also be referred to as a "waveform" hereinafter) of the measurement line predicted on the object when it stays still is approximated by a Gaussian function of a standard deviation D, and the spread amount of the Gaussian function caused by a motion blur is represented by B, an index value using D and B is calculated as the spread degree.

Figure 3A:
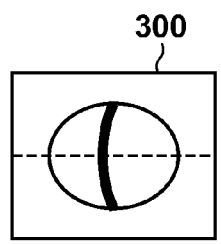
FIGS. 3A and 3B are views for explaining a method of estimating the spread degree of a measurement line.
Figure 3B:
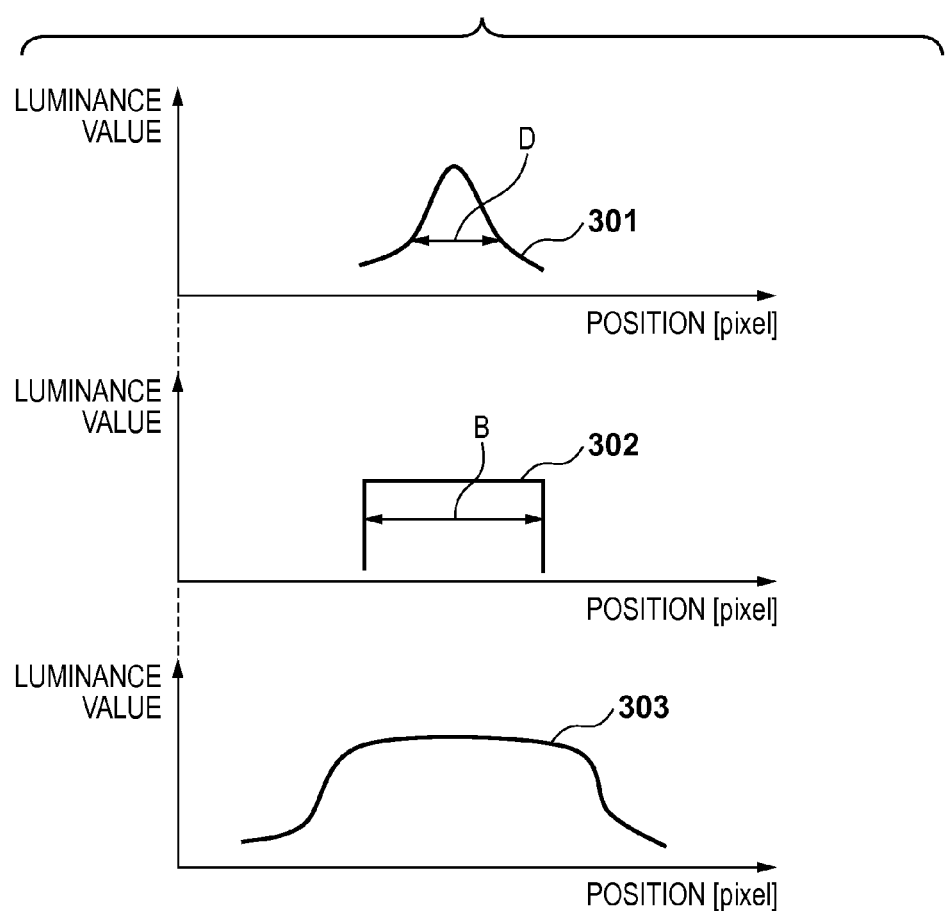

A method of estimating the spread degree of the measurement line will be described with reference to FIGS. 3A and 3B. When the target object 140 is in a still state, the observed waveform of the measurement line is approximated by the Gaussian function. FIG. 3B shows an example of the waveform of the measurement line observed on an image 300 shown in FIG. 3A. Note that the number of measurement lines for the image 300 is one for the sake of simplicity.

A waveform 301 represents the waveform of the measurement line observed when the target object 140 is in a still state. The appearance of the spread degree of the waveform when observing the target object 140 in a still state using the capturing apparatus 120 changes according to defocusing of the surface position of the target object 140 and the position and angle of the surface of the target object 140 with respect to each of the projection apparatus 110 and the capturing apparatus 120. In this embodiment, since the target object 140 is observed when it moves, a motion blur further influences to increase the spread degree.

A rectangular waveform 302 represents the range of the spread caused by a motion blur. Therefore, a waveform 303 obtained by convolution of the waveform 302 and the waveform 301 indicating the Gaussian function is observed as the spread of the measurement line. In other words, the waveform 303 simulates the waveform of the measurement line observed on the image 300 influenced by a blur, a motion blur, and the position and angle of the target object surface. In this embodiment, a spread amount D [pixel] as the standard deviation of the Gaussian function in the waveform 301 and a motion blur amount B [pixel] as the width of the waveform 302 representing the range of the spread caused by a motion blur are estimated as the spread degree.

Figure 4:
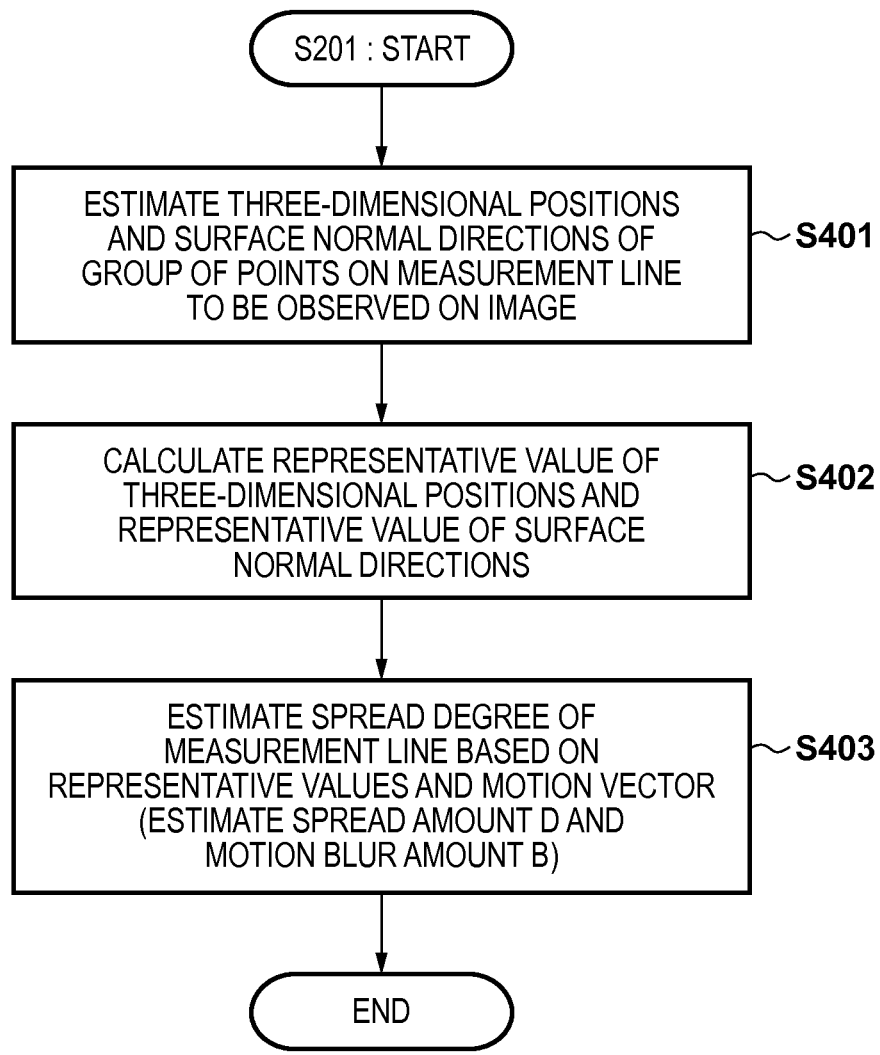
FIG. 4 is a flowchart illustrating spread degree estimation processing.

In this embodiment, the values of the spread amount D and the motion blur amount B are estimated by simulation. FIG. 4 is a flowchart illustrating a method of calculating the spread amount D and the motion blur amount B. Processing shown in FIG. 4 is the spread degree estimation processing in step S201.

The spread degree estimation unit 101 estimates the three-dimensional positions and surface normal directions of a group of points on a measurement line on the surface of the target object 140 to be observed on the image (S401). In this embodiment, assume that the user sets in advance the shape model and the schematic values of the position and orientation of the target object 140, and these values can be used for estimation. A position on the image to be captured by the capturing apparatus 120, at which the measurement line projected from the projection apparatus 110 is observed, is simulated using the shape model and the position and orientation of the target object 140. At this time, for each of a plurality of points (n points) on the measurement line observed on the image to be captured by the capturing apparatus 120, the three-dimensional position and surface normal direction of a corresponding point on the surface of the target object 140 are acquired.

The spread degree estimation unit 101 calculates representative values from the three-dimensional positions and surface normal directions of the n points estimated in step S401 (S402). That is, the average value of the n three-dimensional positions and that of the n surface normal directions are set as representative values, and a representative three-dimensional position X and a representative normal direction N are acquired.

The spread degree estimation unit 101 estimates the spread amount D and motion blur amount B indicating the spread degree of the measurement line by calculation based on the representative three-dimensional position X, the representative normal direction N, and the motion vector V of the target object 140, as follows.

The spread amount D [pixel] caused by a blur and the position and angle of the target object surface is calculated by:

$$D = \frac{1}{\Delta d_C}\left\{g_1 + \frac{f_C}{L_C}|\cos\vartheta_C|g_2\right\} \quad (1)$$

for $$g_1 = \frac{f_C^2|K_C - L_C|}{F_C L_C(K_C - f_C)}$$

-continued $$g_2 = \frac{1}{|\cos\vartheta_P|}\left\{g_3 + \frac{L_P}{f_P}\Delta d_P w\right\}$$

$$g_3 = \frac{f_P|K_P - L_P|}{F_P K_P}$$

In equation (1), a subscript P represents a parameter of the projection apparatus 110, and a subscript C represents a parameter of the capturing apparatus 120. Each parameter is as follows:

K represents the distance [mm] from each apparatus (the projection apparatus 110 or capturing apparatus 120) to a focus position, F represents the f-number of the lens of each apparatus, f represents the focal length [mm] of each apparatus, Δd represents the pixel pitch [mm/pixel] of each apparatus, L represents the distance from the optical center of each apparatus to the representative three-dimensional position X in the optical axis direction, θ represents an angle [rad] formed by the optical axis of each apparatus and the representative normal direction N of the surface of the target object 140, and w represents the width [pixel] of the measurement line on the geometric pattern.

Note that the width w is obtained by approximating the waveform of the section of the measurement line by the Gaussian function. The angle e is an angle on an epipolar plane including the optical centers of the projection apparatus 110 and capturing apparatus 120 and the representative three-dimensional position X. Furthermore, in equation (1), $g_1$ represents the size [mm] of a point occurring on the image plane of the capturing apparatus 120 when observing a point in a real space, $g_2$ represents the size [mm] of the spread of the measurement line on the surface of the target object 140, and $g_3$ represents the size [mm] of a point occurring on a projection plane when the projection apparatus 110 projects a point on a facing surface.

Note that the focal length, focus position, f-number, and pixel pitch of the capturing lens of the capturing apparatus 120 are obtained by referring to the specifications of the apparatus to be used. Alternatively, these values are calculated in advance by the method disclosed in literature 3.

The motion blur amount B[pixel] is calculated by:

$$B = |h(X) - h(X+\Delta)| \quad (2)$$

where Δ represents a change in the three-dimensional position of a point on the measurement line moving during an exposure time, and the function h represents projection calculation of converting the coordinates of the three-dimensional position into image coordinates.

That is, the motion blur amount B calculated by equation (2) represents a change in the two-dimensional position, on the image, of the point on the measurement line moving during the exposure time. The value of Δ in equation (2) is calculated by:

$$\Delta = |V|\frac{|\cos\alpha|}{|\cos\beta|}T \quad (3)$$

where T represents a unit vector from the optical center of the projection apparatus 110 toward the representative three-dimensional position X on the surface of the target object 140, α represents an angle [rad] formed by the representative normal direction N and the motion vector V, and β represents an angle [rad] formed by the representative normal direction N and the unit vector T.

Parameter Setting (S202)

Figure 5A:
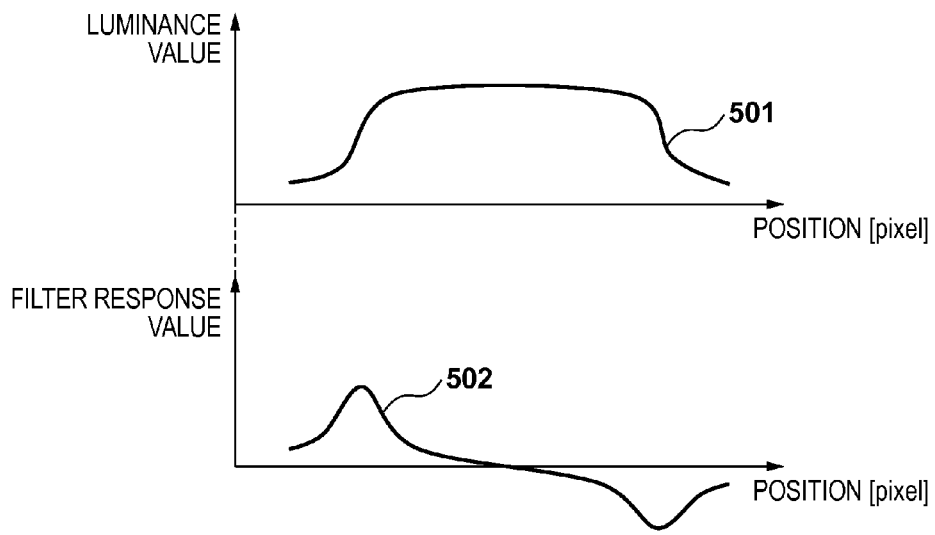
FIGS. 5A and 5B are views for explaining a detection filter setting method.

When the spread amount D and motion blur amount B are estimated as the spread degree of the measurement line in step S201 as described above, the parameter setting unit 102 sets the shape of the detection filter as a parameter according to the spread degree of the measurement line (S202). First, the parameter setting unit 102 calculates the predicted waveform of the measurement line based on the spread amount D and the motion blur amount B. That is, the predicted waveform of the measurement line is calculated by performing the convolution calculation of the Gaussian function of the standard deviation D and a waveform with a width B and a height of 1. Referring to FIG. 5A, a waveform 501 indicates the predicted waveform calculated based on the spread amount D and the motion blur amount B.

Figure 5B:
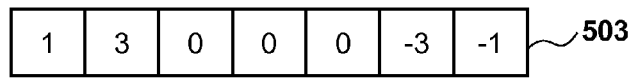

Next, the parameter setting unit 102 performs the numerical calculation of differentiation of the predicted waveform 501 of the measurement line, thereby calculating an output waveform 502 of the detection filter corresponding to the predicted waveform 501. The parameter setting unit 102 quantizes the output waveform 502 of the detection filter by a predetermined threshold for convolution with the image, thereby setting a shape 503 of the detection filter shown in FIG. 5B.

With the above processing, the spread degree of the measurement line is estimated according to a blur and motion blur which are predicted to occur in the image of the target object 140, and the position and angle of the target object surface, and the parameter (in this embodiment, the shape of the detection filter) which can set points on the measurement line at high accuracy is set according to the spread degree. Note that the parameter is set for the entire image to be captured by the capturing apparatus 120.

Acquisition of Image (S203) to Calculation of Three-Dimensional Position (S205)

In steps S203 to S205, the target object 140 is measured using the detection filter set in step S202. First, the image acquisition unit 103 acquires the image obtained by capturing, by the capturing apparatus 120, the geometric pattern 111 projected from the projection apparatus 110 toward the target object 140 (S203).

Based on the detection filter set by the parameter setting unit 102, the point setting unit 104 sets points on the measurement line on the image acquired by the image acquisition unit 103 (S204). Points are set by applying the detection filter in a direction (in this embodiment, the horizontal direction of the image) along the epipolar line on the image. That is, the point setting unit 104 performs the convolution calculation of the detection filter and a scan line in the epipolar line direction of the image, and searches for the zero-crossing point of the response value of the convolution calculation in the horizontal direction of the image. If the gradient of the response values before and after the detected zero-crossing point is equal to or larger than a threshold, that is, if a change in luminance value on the image is sufficiently sharp, the zero-crossing point is set as a point (detected point) on the measurement line. Points on the respective measurement lines are set in step S204. In other words, points on the geometric pattern of the image are set.

Based on triangulation, the three-dimensional position calculation unit 105 calculates three-dimensional positions on the surface of the target object 140, which correspond to the detected points set by the point setting unit 104 (S205). First, the three-dimensional position calculation unit 105 identifies a measurement line on the geometric pattern, to which each detected point on the image belongs. In this embodiment, detected points which are arranged side by side and are close to each other on the image are labeled as one line, and a measurement line to which each detected point belongs is identified based on the order of the lines indicated by labeling on the image. Then, a three-dimensional position is calculated based on the principle of a light-section method from the relationship between the position of the detected point on the image and the position of the corresponding measurement line on the geometric pattern. By performing the above processing for all the detected points on the scan line, it is possible to calculate three-dimensional positions on the surface of the target object 140, which correspond to the scan line.

According to this embodiment, as described above, the spread degree of a geometric feature caused by the influence of a blur, a motion blur, and the position and angle of the target object surface is estimated, and the shape of a detection filter to be used to set points on the geometric feature is set based on the estimated value. This can set points on the geometric feature at high accuracy, and improve the accuracy of three-dimensional positions calculated from the set points on the geometric feature.

Modification of Embodiment

The projection apparatus 110 and capturing apparatus 120 are arranged so that their epipolar lines are parallel to the horizontal direction of an image plane. However, the arrangement in which the epipolar lines are parallel to the horizontal direction of the image plane on the image is not essential. If the epipolar lines are not parallel, detected point setting processing may be performed based on an image in which the epipolar lines are made approximately parallel by rotating the image, or a scan direction in which convolution calculation with a detection filter is performed may be changed in a direction along the epipolar lines instead of the horizontal direction.

The value of the spread amount D estimated by the spread degree estimation unit 101 may be any index representing the predicted spread degree of the measurement line on the image when capturing the target object in a still state. For example, a standard deviation or the half width of the waveform may be used. The approximate function of the waveform may be any function capable of approximating a hill shape (or valley shape), or may be a triangular wave or an arbitrary point spread function. Furthermore, instead of converting the spread degree into a numerical value by approximation using the function, a waveform itself to be observed may be estimated. In this case, the parameter setting unit 102 sets a detection filter by differentiating the estimated waveform.

As for the equation for calculating the spread amount D from the representative three-dimensional position X and the representative normal direction N by the spread degree estimation unit 101, the spread amount D for the representative three-dimensional position X and the representative normal direction N may be stored in a table from an actual image to perform calculation, instead of estimating the spread amount D according to the logical expression. In this case, a spread amount table is created as a preparation for calculation of the value of the spread amount D of the measurement line observed on the image to be captured by the capturing apparatus 120 from an actual image by arranging planar objects at a plurality of positions in a plurality of directions. When creating a spread amount table, the value of D for each set of X and N is obtained from a standard deviation when fitting the Gaussian function by the least-squares method with respect to the measurement line observed on the image.

Similarly, the motion blur amount B for X, N, and V may be stored in a table to perform calculation. In this case, a motion blur amount table is created as a preparation for calculation of the value of the motion blur amount B of the measurement line observed on the image to be captured by the capturing apparatus 120 from the image by moving the planar objects arranged at the plurality of positions in the plurality of directions by a motion vector. When creating a motion blur amount table, the value of the motion blur amount B for each set of X, N, and V is obtained from a standard deviation when fitting a rectangular waveform by the least-squares method with respect to the measurement line observed on the image.

As a method of acquiring the position and orientation of the target object by the spread degree estimation unit 101, it is only necessary to acquire the information by assuming that the position and orientation of the target object to be observed are known. Alternatively, an image of the target object may be captured, and the position and orientation of the target object may be obtained on the image by template matching. As a method of acquiring the motion vector V of the target object, the motion vector at the time of capturing the target object may be known, or it may be assumed that the target object is arranged on a moving apparatus such as a conveyor to acquire the motion vector from the control value of the conveyor or the like. Also, it may be assumed that the target object is gripped by a multi-joint robot arm or the like, thereby acquiring the motion vector from the control value of the robot arm or the like.

As a method of calculating the representative three-dimensional position X and the representative normal direction N by the spread degree estimation unit 101, any calculation method capable of calculating a value which can approximate an observed point group may be used, and an average value or median may be used.

In the above description, movement of the target object is represented by the motion vector V of the three-dimensional position. Assuming that the three-dimensional orientation also changes, a six-dimensional position and orientation change vector U may be used. In this case, the motion vector V in equation (3) is calculated by:

$$V = \frac{\partial X}{\partial U} \cdot U \tag{4}$$

where ∂x/au represents a Jacobian indicating a change in the representative three-dimensional position X with respect to the change in the position and orientation of the target object.

The detection filter for convolution calculation set by the parameter setting unit 102 may be a one-dimensional detection filter or a two-dimensional detection filter having a two-dimensional width like a Sobel filter. The set filter may be any detection filter whose size increases according to the spread degree of the measurement line estimated by the spread degree estimation unit 101. For example, a differentiation filter such as a Sobel filter whose size increases in proportion to the magnitudes of D and B may be set.

A method of identifying, by the three-dimensional position calculation unit 105, a measurement line to which a detected point belongs may be any method capable of identifying a measurement line of the geometric pattern to which a detected point belongs. For example, a method of identifying a measurement line based on features given to the measurement lines of a geometric pattern, which is disclosed in Japanese Patent Laid-Open No. 1-274007, may be used. Furthermore, a measurement line may be identified by a color using a color illumination apparatus/capturing apparatus. When the schematic position and orientation and the shape model of an object to be measured are known, the positions of measurement lines to be observed on an image may be predicted, and a measurement line may be identified by correspondence between a detected point and a measurement line close to the detected point. If only one measurement line is projected, identification is not necessary. As for calculation of three-dimensional positions, it is not always necessary to calculate three-dimensional positions from all the detected points. For example, only three-dimensional positions within a designated region on an image may be calculated, or the detected points may be thinned out at predetermined intervals to calculate three-dimensional positions.

Use of Pre-Measurement

A case in which the spread degree estimation unit 101 estimates the spread degree of a geometric feature by calculating the representative three-dimensional position X and representative normal direction N on the surface of a target object surface based on the position and orientation and the shape model of the target object has been described above. A method of calculating the representative three-dimensional position X and representative normal direction N on the target object surface from the position information of the three-dimensional point group on the target object surface, which has been obtained using a predetermined detection filter, will be explained below.

First, the point setting unit 104 sets points on the measurement line on an image of the target object 140 captured by the capturing apparatus 120 using a detection filter having a predetermined shape. The three-dimensional position calculation unit 105 calculates the three-dimensional positions of the detected points set by the point setting unit 104 (the above measurement will be referred to as "pre-measurement" hereinafter).

Next, the spread degree estimation unit 101 generates a polygon model of the target object 140 by connecting adjacent points of the calculated three-dimensional point group to arrange a triangular mesh. Based on the generated polygon model, the spread degree estimation unit 101 simulates the position of the measurement line projected from the projection apparatus 110, which is to be observed on the image to be captured by the capturing apparatus 120. The spread degree estimation unit 101 acquires a three-dimensional position and surface normal direction on the surface of the target object 140 for each of the points (n points) on the measurement line observed on the image to be captured. The spread degree estimation unit 101 obtains the representative three-dimensional position X and the representative normal direction N by calculating the average value of the n three-dimensional positions and that of the n surface normal directions. Note that a method of calculating the spread amount D and the motion blur amount B based on X and N is the same as the above-described method.

As described above, as the representative three-dimensional position X and the representative normal direction N of the target object 140 to be used to estimate the spread degree of the measurement line, the position information of the three-dimensional point group on the target object surface, which has been obtained by pre-measurement, may be used. Estimating the spread degree of the geometric feature based on an actual image improves the estimation accuracy.

Use of Actual Image or Simulation Image

A case in which the spread degree estimation unit 101 estimates the spread degree of the measurement line by calculating the representative three-dimensional position X and the representative normal direction N on the target object surface based on the position and orientation and the shape model of the target object has been described above. A method of estimating the spread amount D and the motion blur amount B from an image obtained by capturing in advance a target object or an object simulating it using the capturing apparatus 120 will be explained below.

The image acquisition unit 103 acquires an image (to be referred to as a "pre-image" hereinafter) obtained by capturing a target object on which a geometric pattern has been projected or an object simulating the target object using the capturing apparatus 120. The point setting unit 104 schematically detects, as detected points, points on a measurement line observed on the pre-image using a predetermined detection filter.

The spread degree estimation unit 101 calculates the spread amount D and the motion blur amount B at each detected point by fitting a function having the spread amount D and motion blur amount B as parameters using the least-squares method, and calculates the average value of the spread amounts and that of the motion blur amounts, thereby obtaining the spread amount D and the motion blur amount B as representative values on the image.

Note that as for calculation of the spread amount D and motion blur amount B, instead of fitting by the least-squares method, schematic calculation of the spread amount D=G/2 and the motion blur amount B=G/2 may be used by extracting regions where a measurement line is observed by binarizing the image, and setting G as the average value of the widths of the regions.

Instead of an actual image, a simulation image may be used as an image used to estimate the spread amount D and motion blur amount B. For example, it is possible to use an image obtained by simulating an image observed as a captured image based on the shape model and the position and orientation of the target object 140. Rendering software for performing jittering or the like may be used to generate a simulation image.

As described above, the spread degree of the measurement line may be calculated using an image captured or created in advance. Estimating the spread degree of the geometric feature using an actual image or simulation image improves the estimation accuracy.

Use of Fixed Value

A case in which the spread degree estimation unit 101 estimates both the spread amount D and the motion blur amount B has been described above. However, one of these values may be estimated and the other value may be given as a parameter set in advance. For example, when no motion blur is assumed, the motion blur amount B=0 [pixel] is given. Alternatively, if a blur is difficult to occur or the position and angle of the object surface is uniform within a screen, the spread amount D of the geometric feature in a still state may be a fixed value preset by the user.

The motion vector V can also be a fixed value. In other words, the spread degree estimation unit 101 need only estimate the spread degree of the geometric feature based on at least one of the three-dimensional position, surface normal direction, and motion vector of each of the plurality of points on the measurement line.

Use of Template Matching

A case in which the point setting unit 104 performs the convolution calculation of an image and a detection filter and sets points on the geometric feature based on the response value of the convolution calculation has been described above. The point setting method may be any method capable of detecting the geometric feature on the image according to values indicated as the spread degree of the geometric feature. For example, detection may be performed by template matching. In this case, the parameter setting unit 102 sets the shape of a template according to the spread degree estimated by the spread degree estimation unit 101. As the shape of the template, a result of quantizing, by a predetermined threshold, the waveform (the waveform 501 shown in FIG. 5A) of the measurement line which can be estimated from the spread amount D and motion blur amount B is set. The point setting unit 104 searches for an image using the template set by the parameter setting unit 102, calculates an error value by performing matching with the template, and detects a local minimum position, thereby setting a point on the measurement line.

Second Embodiment

The second embodiment of the present invention will be described below. In the second embodiment, a method of setting, as a parameter set by a parameter setting unit 102, the resize ratio of an image for which convolution calculation is performed using a detection filter will be explained. In other words, in the first embodiment, the shape of the detection filter is adjusted according to the spread degree of the measurement line. To the contrary, in the second embodiment, the detection filter has a fixed shape, and the size of the image itself is adjusted according to the detection filter.

Figure 2:
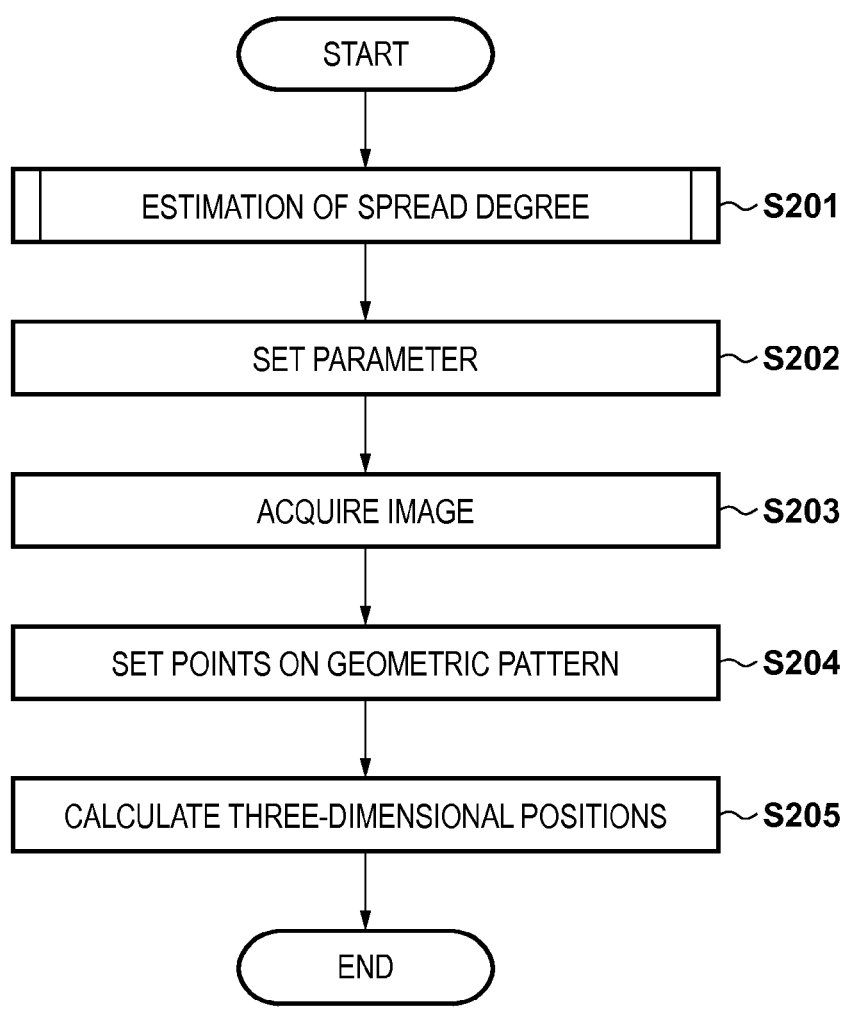
FIG. 2 is a flowchart illustrating three-dimensional position measurement processing according to the embodiment.

In the second embodiment, parameter setting processing in step S202 and detected point setting processing in step S204 in the flowchart shown in FIG. 2 are different from those in the first embodiment. The remaining components and processes are the same as in the first embodiment and a description thereof will be omitted. The processes in steps S202 and S204 according to the second embodiment will be described below.

Parameter Setting (S202)

The parameter setting unit 102 sets the resize ratio of an image according to the spread degree of a measurement line estimated by a spread degree estimation unit 101. As in the first embodiment, the parameter setting unit 102 calculates a waveform S of the measurement line observed on the image based on the values of a spread amount D and motion blur amount B. The parameter setting unit 102 sets a resize ratio R so that the spread of the waveform S falls within a predetermined spread degree. In the second embodiment, the parameter setting unit 102 calculates a standard deviation Z of the waveform S, and calculates the resize ratio R=E/Z so that the standard deviation Z becomes equal to a predetermined value E.

The value of the resize ratio R corresponds to a parameter for converting the waveform S of the measurement line observed on the image captured by a capturing apparatus 120 into a waveform S' having a standard deviation of the predetermined value E. Furthermore, in the second embodiment, the shape of a detection filter is indicated by a value predetermined by the parameter E, and a detection filter generated from a waveform obtained by differentiating the Gaussian function of the standard deviation E is prepared.

Detected Point Setting (S204)

A point setting unit 104 sets points on the measurement line on the image acquired by an image acquisition unit 103 based on the resize ratio R set by the parameter setting unit 102. First, the point setting unit 104 resizes the image by R. The image is resized in a direction (for example, the horizontal direction of the image) along an epipolar line on the image. Next, the convolution calculation of the detection filter prepared in advance and the resized image is performed to search for the zero-crossing point of a response value in the horizontal direction of the image. If the gradient of the response values before and after the detected zero-crossing point is equal to or larger than a threshold, the zero-crossing point is set as a point (detected point) on the measurement line, and the position of the detected point before resizing is calculated by multiplying the position information of the detected point on the resized image by 1/R.

As described above, according to the second embodiment, the spread degree of a geometric feature caused by the influence of a blur, a motion blur, and the position and angle of the target object surface is estimated, and the image from which the geometric feature is detected is resized based on the estimated value, thereby calculating and setting points on the geometric feature at high accuracy. This can improve the accuracy of three-dimensional positions calculated from the set points on the geometric feature.

Note that as the resize ratio R according to the second embodiment, a value of reducing the image is set according to the magnitude of the spread amount D and that of the motion blur amount B. For example, schematic calculation may be performed according to R=E/(D+B).

Third Embodiment

The third embodiment of the present invention will be described below. In the third embodiment, a method of setting a plurality of detection filters having different shapes as parameters set by a parameter setting unit 102 and setting points on a measurement line will be explained. In the third embodiment, by considering that a spread amount D and motion blur amount B which are estimated by a spread degree estimation unit 101 include errors, various sets of D and B are prepared within predetermined ranges with reference to the estimated values. After setting points on a measurement line using a detection filter of each set, the response values of the respective detection filters are compared with each other, a point assumed to have relatively high detection accuracy is selectively set as a detected point.

In the third embodiment, parameter setting processing in step S202 and detected point setting processing in step S204 in the flowchart shown in FIG. 2 are different from those in the first embodiment. The remaining components and processes are the same as those in the first embodiment and a description thereof will be omitted. The processes in steps S202 and S204 according to the third embodiment will be described below.

Parameter Setting (S202)

The parameter setting unit 102 sets a plurality of detection filter shapes according to the spread degree of a measurement line estimated by the spread degree estimation unit 101. A plurality of values $D_j$ and a plurality of values $B_k$ are set within ranges of $D\pm\Delta D$ and $B\pm\Delta$ obtained by changing the spread amount D and motion blur amount B within predetermined ranges ($\Delta D$ and $\Delta B$). Note that the number of values to be set and a step width are given as parameters in advance. A plurality of detection filters having different shapes are set based on a plurality of sets of $D_j$ and $B_k$. Note that the method of setting the shape of a detection filter is the same as in the first embodiment.

Detected Point Setting (S204)

Based on the plurality of detection filters set by the parameter setting unit 102, a point setting unit 104 sets points on a measurement line on an image acquired by an image acquisition unit 103. First, by setting points on the measurement line on the image using each detection filter, detected points on the image are obtained for each detection filter. Among point groups corresponding to the plurality of detection filters which have detected points on one measurement line, points assumed to have relatively high detection accuracy are selectively set as detected points. That is, if adjacent points within a predetermined range E [pixel] which have been detected by the different detection filters exist in each scan line (for example, the horizontal line of the image), the gradient before and after the zero-crossing point of the response value of each detection filter is checked, a point corresponding to a zero-crossing point detected from a response value for which the gradient is largest, that is, a change in luminance value on the image is sharpest is selected as a detected point.

As described above, according to the third embodiment, the spread degree of the geometric feature caused by the influence of a blur, a motion blur, and the position and angle of the target object surface is estimated, and a plurality of parameters are set with reference to the estimated value by considering that the estimated value includes an error. As compared with a method of setting only one parameter, the setting accuracy of points on the geometric feature improves. This can improve the accuracy of three-dimensional positions calculated from the set points on the geometric feature.

Note that a case in which a plurality of detection filters are set as parameters has been explained in the third embodiment. However, as described in the second embodiment, a plurality of resize ratios of the image may be set as parameters.

Furthermore, $\Delta D$ and $\Delta B$ for defining the setting range of the parameter setting unit 102 can be set as follows. That is, in step S401, the spread degree estimation unit 101 calculates a representative three-dimensional position X and representative normal direction N as representative values of the three-dimensional positions and surface normal directions of a group of points on the measurement line, and also calculates variations $\Delta X$ and $\Delta N$. Note that as a variation index, for example, a standard deviation can be used. By substituting values based on $X\pm\Delta X$ and $N\pm\Delta N$ into estimation equations (1) and (2) above, values of $D\pm\Delta D$ and $B\pm\Delta B$ are acquired.

Fourth Embodiment

The fourth embodiment of the present invention will be described below. In the fourth embodiment, a method of setting a parameter for each region obtained by dividing an image region, and setting points on a measurement line will be explained. In the first embodiment, one type of spread degree is estimated for the entire image. However, the spread degree is different for each region of an object actually observed on an image. To cope with this, in the fourth embodiment, a parameter is set for each region.

In the fourth embodiment, spread degree estimation processing in step S201, parameter setting processing in step S202, and detected point setting processing in step S204 in the flowchart shown in FIG. 2 are different from those in the first embodiment. The remaining components and processes are the same as in the first embodiment and a description thereof will be omitted. The processes in steps S201, S202, and S204 according to the fourth embodiment will be described below.

Estimation of Spread Degree (S201)

A spread degree estimation unit 101 estimates the spread degree of a measurement line observed on an image to be captured by a capturing apparatus 120 for each region of the image. In the fourth embodiment, the image captured by the capturing apparatus 120 is divided into K macro blocks, and the spread degree of the measurement line is estimated for each macro block.

First, the representative value of three-dimensional positions and that of surface normal directions on a target object surface corresponding to the measurement line observed on the image are estimated. In the fourth embodiment, a position where the measurement line projected from the projection apparatus 110 is observed on an image to be captured by the capturing apparatus 120 is simulated using the shape mode and the position and orientation of a target object 140. At this time, a three-dimensional position and surface normal direction on the target object surface are acquired for each of n points on the measurement line observed on the image captured by the capturing apparatus 120. Next, the average values of the three-dimensional positions and surface normal directions of points observed in each macro block i (i=1, 2, . . . , K) among the n points are calculated, thereby obtaining a representative three-dimensional position Xi and a representative normal direction Ni. A method of calculating a spread amount D and a motion blur amount B from the representative three-dimensional position Xi and the representative normal direction Ni is the same as in the first embodiment. The spread amount D and the motion blur amount B are calculated for each macro block.

Parameter Setting (S202)

A parameter setting unit 102 sets the waveform of a detection filter according to the spread degree of the measurement line estimated by the spread degree estimation unit 101 for each region of the image. A method of setting a detection filter based on the representative three-dimensional position Xi and the representative normal direction Ni for each macro block i is the same as in the first embodiment.

Detected Point Setting (S204)

Based on the plurality of detection filters set by the parameter setting unit 102 for the respective regions of the image, a point setting unit 104 sets points on the measurement line on an image acquired by an image acquisition unit 103. A method of setting points on the measurement line by applying the detection filters set for the respective macro blocks is the same as in the first embodiment.

As described above, according to the fourth embodiment, the spread degree of the geometric feature caused by the influence of a blur, a motion blur, and the position and angle of the target object surface is estimated for each region of the image, and a parameter is set for each region. Therefore, as compared with a method of setting only one parameter for the entire image, the setting accuracy of points on the geometric feature improves. This can improve the accuracy of three-dimensional positions calculated from set detected points.

Note that any method of dividing an image into regions may be used in the fourth embodiment. An image may be divided in a grid pattern, or an image of a target object captured in advance may be divided into regions by segmentation. Also, regions of surfaces of the target object observed by the capturing apparatus 120 may be estimated based on the shape model and the position and orientation of the target object, and an image may be divided for each surface.

Fifth Embodiment

The fifth embodiment of the present invention will be described below. In the first embodiment, the method of projecting the geometric pattern including the plurality of measurement lines and detecting points on the measurement lines observed on the image at high accuracy has been described. However, the geometric features of the geometric pattern are not necessarily lines. In the fifth embodiment, a geometric pattern formed from a plurality of points is used.

Figure 6:
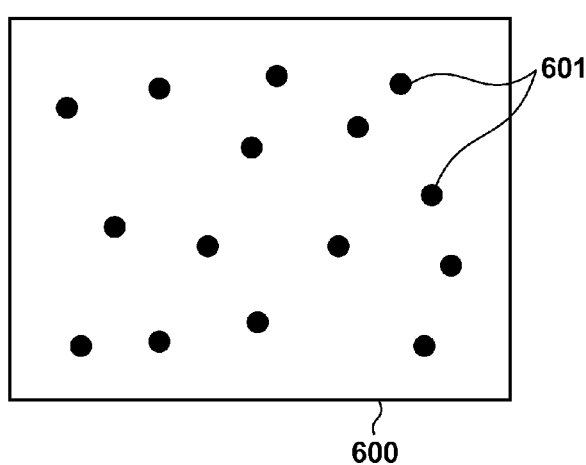
FIG. 6 is a view showing an example of a geometric pattern including a plurality of measurement points.

In the fifth embodiment, as shown in FIG. 6, a geometric pattern 600 including a plurality of points (measurement points) 601 is used. In this case, to set the measurement points 601, the two-dimensional positions of the measurement points 601 indicating the vertical and horizontal positions of the measurement points 601 are set by applying differentiation filters respectively having the vertical and horizontal directions of an image, and detecting the zero-crossing points of the response values of the filters. At this time, it is possible to improve the detection accuracy by estimating the spread degree (spread amounts Dx and Dy and motion blur amounts Bx and By) of the measurement points 601 in the vertical and horizontal directions of the image, and setting the shapes of detection filters in the vertical and horizontal directions based on the estimated value.

Note that as a method of identifying each measurement point 601, for example, the epipolar line of the geometric pattern is searched for based on the position of each measurement point 601 observed on the image, and matching with the position of each measurement point 601 on the geometric pattern is performed, thereby identifying the measurement point. Alternatively, a different color may be given to each measurement point 601 on the geometric pattern, and each measurement point 601 may be identified based on the color of each measurement point observed on the image.

As described above, according to the fifth embodiment, the spread degrees of the geometric feature in the two directions on the image caused by the influence of a blur, a motion blur, and the position and angle of the target object surface are estimated, and a parameter is set based on the estimated values. This makes it possible to calculate the two-dimensional positions of points on the geometric feature at high accuracy, thereby improving the accuracy of three-dimensional positions calculated from the set points on the geometric feature.

Results in Each Embodiment

Results obtained in each of the above-described embodiments will be collectively described below.

According to the first embodiment, it is possible to set points on a geometric feature at high accuracy by estimating the spread degree of the geometric feature caused by the influence of a blur, a motion blur, and the position and angle of a target object surface, and setting the shape of a detection filter to be used to set points on the geometric feature based on the estimated value.

As described in the first embodiment, when estimating the spread degree of the geometric feature based on simulation, the overall processing is performed at high speed since no target object is captured in advance. On the other hand, as described in the modification of the first embodiment, when estimating the spread degree of the geometric feature based on an actual image or simulation image, the estimation accuracy of the spread degree becomes high.

According to the second embodiment, it is possible to calculate and set points on a geometric feature at high accuracy by estimating the spread degree of the geometric feature caused by the influence of a blur, a motion blur, and the position and angle of a target object surface, and resizing an image, from which the geometric feature is detected, based on the estimated value.

According to the third embodiment, the spread degree of a geometric feature caused by the influence of a blur, a motion blur, and the position and angle of a target object surface is estimated, and a plurality of parameters (a plurality of detection filters) are set with reference to the estimated value by considering that the estimated value includes an error. As compared with a method of setting only one parameter, the setting accuracy of points on the geometric feature improves.

According to the fourth embodiment, the spread degree of a geometric feature caused by the influence of a blur, a motion blur, and the position and angle of a target object surface is estimated for each region of an image, and a parameter is set for each region. As compared with a method of setting only one parameter for the entire image, therefore, the setting accuracy of points on the geometric feature improves.

According to the fifth embodiment, the spread degrees of a geometric feature in two directions on an image caused by the influence of a blur, a motion blur, and the position and angle of a target object surface are estimated, and a parameter is set based on the estimated values, thereby making it possible to calculate the two-dimensional positions of points on the geometric feature at high accuracy.

According to any of the above embodiments, it is possible to set points on a geometric feature at high accuracy in an image obtained by capturing an object on which a geometric pattern has been projected, thereby improving the accuracy of three-dimensional positions calculated from the set points (detected points). In other words, by using an image obtained by capturing an object on which a geometric pattern has been projected, it is possible to measure three-dimensional positions on the surface of the object at high accuracy.

Modification of Embodiments

The projection apparatus 110 may be any apparatus which projects a pattern including a geometric feature. For example, a projector which projects a two-dimensional image or an apparatus formed from a combination of a light source and a mask pattern may be used. A pattern to be projected may be a grayscale pattern or color pattern.

The geometric feature may be any feature in which a waveform indicating a hill-shaped (or valley-shaped) change in luminance value on an image can be obtained. The geometric feature may be linear or punctate.

The image acquired by the capturing apparatus 120 may be any two-dimensional image. For example, the image may be a grayscale image or color image.

The spread degree of the geometric feature observed on the image captured by the capturing apparatus 120, which is estimated by the spread degree estimation unit 101, may be any information indicating the spread of the geometric feature observed on the image. For example, only a spread amount representing the luminance distribution observed when the target object is in a still state may be used, only a motion blur amount may be used, or both of them may be used. Also, the profile of the waveform itself of a change in luminance actually observed on the image may be used. The spread amount/motion blur amount may be estimated by simulation based on the shape model and the position and orientation of the target object or the three-dimensional position information on the target object surface, or may be estimated from an actual image obtained by capturing the target object or an object simulating it.

The parameter set by the parameter setting unit 102 may be any parameter for detecting the geometric feature from the image according to the spread degree of the geometric feature estimated by the spread degree estimation unit 101. If a detection filter is used to detect the geometric feature, the shape of the detection filter need only be set according to the spread degree of the geometric feature. Also, the resize ratio of the image from which the geometric feature is to be detected may be set according to the spread degree of the geometric feature. If detection processing is performed using template matching, it is only necessary to set the shape of a template according to the spread degree of the geometric feature.

As the image acquisition method by the image acquisition unit 103, a captured image may be directly acquired from the capturing apparatus 120, an image temporarily stored in a memory may be acquired later, or an image may be acquired through a network.

The point setting unit 104 may use any method of setting points on the geometric feature according to the spread of the geometric feature observed on the image based on the parameter set by the parameter setting unit 102 for the image acquired by the image acquisition unit 103. A method of performing convolution calculation using a detection filter and setting points on the geometric feature based on the response value of the convolution calculation, or a method of setting points on the geometric feature by matching with a template may be used.

A method in which the three-dimensional position calculation unit 105 calculates three-dimensional positions corresponding to the points on the geometric feature set by the point setting unit 104 may be any method based on triangulation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-083994, filed Apr. 15, 2014 which is hereby incorporated by reference herein in its entirety.

What is claimed is:

1. An information processing apparatus comprising:
   an estimation unit configured to estimate a spread degree of a geometric feature projected onto a surface of an object to be measured, wherein the geometric feature is included in a geometric pattern projected onto the surface of the object to be measured, and is observed in an image obtained by an image capture unit that captures an image of the object on which the geometric pattern is projected;
   a parameter setting unit configured to set a parameter based on the estimated spread degree;
   a point setting unit configured to determine, based on the parameter, a point location of the geometric pattern in a captured image obtained by capturing the image of the object to be measured on which the geometric pattern is projected; and
   a calculation unit configured to calculate a three-dimensional position on the surface of the object corresponding to the determined point,
   wherein at least one of the estimation unit, the parameter setting unit, the point setting unit, or the calculation unit is implemented using a processor.

2. The apparatus according to claim 1, wherein the estimated spread degree indicates a spread degree of the projected geometric feature in the image, and the spread degree of the geometric feature is observed when scanning pixels of the captured image in a predetermined direction.

3. The apparatus according to claim 1, wherein the estimation unit estimates the spread degree based on a luminance distribution of the projected geometric feature predicted in an image obtained by capturing the object which is stationary, and a spread of the luminance distribution occurred by a motion blur which is caused by motion of the object.

4. The apparatus according to claim 1, wherein the parameter setting unit sets a filter for detecting a position of the geometric feature in the captured image as the parameter, and
   the point setting unit applies the filter to a predetermined direction with respect to the captured image to determine the point on the geometric pattern.

5. The apparatus according to claim 1, wherein the parameter setting unit sets a resize ratio of the captured image as the parameter, and
   the point setting unit modifies a size of the captured image in accordance with the resize ratio, apples a predetermined filter to an epipolar line direction with respect to the resized image to set the point on the geometric pattern.

6. The apparatus according to claim 1, wherein the estimation unit calculate a three dimensional position and/or surface normal direction on the surface of the object, and estimates the spread degree by a calculation based on parameters of an capturing apparatus for capturing the object, parameters of an projection apparatus for projecting the geometric pattern, and at least one of the three dimensional position, the surface normal direction, and a moving vector of the object.

7. The apparatus according to claim 6, wherein the estimation unit calculates the three dimensional position and/or surface normal direction on the surface of the object based on a shape model of the object, and a position and an orientation of the object.

8. The apparatus according to claim 1, further comprising a detection unit configured to apply a predetermined filter to a predetermined direction with respect to a pre-image, which is obtained by capturing and image of the object to be measured or an object that simulates the object to be measured, to detect a position of the geometric feature in the pre-image, wherein the estimation unit estimates the spread degree based on the position of the projected geometric feature detected in the pre-image.

9. The apparatus according to claim 1, further comprising a detection unit configured to apply a predetermined filter to a predetermined direction with respect to a simulation image, which simulates an image to be observed as the captured image based on a shape model of the object, and a position and an orientation of the object, to detect a position of the geometric feature in the simulation image,
   wherein the estimation unit estimates the spread degree based on the position of the geometric feature detected in the simulation image.

10. The apparatus according to claim 1, wherein the parameter setting unit sets a plurality of parameters, and
    the point setting unit determines a point on the geometric pattern based on each of the plurality of parameters, and selects a point on the geometric pattern from a plurality of determined points corresponding to the plurality of parameters.

11. The apparatus according to claim 10, wherein the parameter setting unit sets a plurality of filters to detect a position on the geometric pattern in the captured image as the plurality of parameters.

12. The apparatus according to claim 10, wherein the parameter setting unit sets a plurality of resize ratios for the captured image as the plurality of parameters.

13. The apparatus according to claim 1, wherein the estimation unit estimates the spread degree of the geometric feature for each region divided from the image,
    the parameter setting unit sets, for each region, a parameter based on the spread degree corresponding to the region, and
    the point setting unit sets, for each region, a point on the geometric pattern based on the parameter corresponding to the region.

14. The apparatus according to claim 1, wherein the geometric pattern comprises the geometric feature of linear or punctate.

15. The apparatus according to claim 1, further comprising:
    a projection unit configured to project the geometric pattern; and
    a capturing unit configured to capture the captured image.

16. A measurement apparatus comprising:
    a projection apparatus configured to project a geometric pattern on an object to be measured;

a capturing apparatus configured to capture an image of the object on which the geometric pattern is projected; and an information processing apparatus according to claim 1.

17. An information processing method comprising:

using a processor to perform steps of:

estimating a spread degree of a geometric feature projected onto a surface of an object to be measured, wherein the geometric feature is included in a geometric pattern projected onto a surface of the object to be measured, and is observed in an image obtained by an image capture unit that captures an image of the object on which the geometric pattern is projected;

setting a parameter based on the estimated spread degree;

determining, based on the parameter, a point location of the geometric pattern in a captured image obtained by capturing the image of the object to be measured on which the geometric pattern is projected; and calculating a three-dimensional position on the surface of the object corresponding to the determined point.

18. A non-transitory computer-readable medium storing a computer-executable program for causing a computer to perform an information processing method, the method comprising steps of:

estimating a spread degree of a geometric feature projected onto a surface of an object to be measured, wherein the geometric feature is included in a geometric pattern projected onto a surface of the object to be measured, and is observed in an image obtained by an image capture unit that captures an image of the object on which the geometric pattern is projected;

setting a parameter based on the estimated spread degree;

determining, based on the parameter, a point location of the geometric pattern in a captured image obtained by capturing the image of the object to be measured on which the geometric pattern is projected; and calculating a three-dimensional position on the surface of the object corresponding to the determined point.

* * * * *